2,927,928

PRODUCTION OF 3-N-MONOSUBSTITUTED AMINO-1-ARYL-5-PYRAZOLONES

Heinz Schulze, Cincinnati, Ohio, assignor to General Aniline & Film Corporation, New York, N.Y., a corporation of Delaware No Drawing. Application February 6, 1958
Serial No. 713,535

8 Claims. (Cl. 260—310)

This invention relates to 3-N-monosubstituted-amino-1-aryl-5-pyrazolones and particularly to 3-alkylamino and 3-arylamino-1-aryl-5-pyrazolones and to a process of preparing them.

The N-monosubstituted-amino-1-aryl-5-pyrazolones are known compounds and find extensive use and application as couplers in color photography since they react with the oxidation products of primary aromatic amino developing agents on color development to yield magenta dye images.

Pyrazolone couplers of the above type are described by Weissberger and Porter in JACS 64, 2133 (1942) wherein is disclosed the preparation of 3-anilino-1-phenyl-5-pyrazolone by heating 3-amino-1-phenyl-5-pyrazolone with excess aniline. In a later article, JACS 76, 3993 (1954), Weissberger and co-workers extended this reaction to include alkylamines. Thus, ethylamine was heated with 3-amino-1-phenyl-5-pyrazolone at a temperature of 140° C. However, the yield of 3-alkylamino-1-aryl-5-pyrazolone was very low, being in the neighborhood of less than 10% while the bulk of the reaction product consisted of 3,3′-iminobispyrazolones and 3,3′-alkylaminobispyrazolones.

A recent British Patent 737,692 describes the reaction of 3-amino-1-aryl-5-pyrazolones with various amines such as alkyl, aralkyl and cycloalkylamines in the presence of organic carboxylic acid solvents such as acetic acid or high boiling neutral solvents such as 2-ethoxyethanol. It is to be noted, however, that the above British patent does not mention aromatic amines which would preclude the preparation of 1-aryl-5-pyrazolones containing arylamino substituents in the 3-position.

It has now been discovered that 3-N-monosubstituted-amino-1-aryl-5-pyrazolones can be produced in a manner free of the shortcomings of the prior art by reacting an ω-arylamidrazone or a hydrohalide salt thereof of the following general formula:

I.
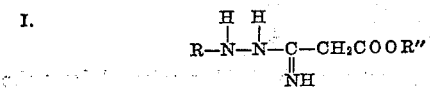

wherein R represents an aryl group such as phenyl, i.e., alkylphenyl, e.g., methylphenyl, ethylphenyl, propylphenyl, butylphenyl, amylphenyl, hexylphenyl, etc.; halophenyl, e.g., chlorophenyl, dichlorophenyl, trichlorophenyl, bromophenyl, dibromophenyl, tribromophenyl, etc.; nitrophenyl, alkoxyphenyl, e.g., methoxyphenyl, ethoxyphenyl, propoxyphenyl, butoxyphenyl, etc.; diphenyl, α- and β-naphthyl, etc.; and R″ represents a lower alkyl group such as methyl, ethyl, propyl, butyl, etc.; with a primary alkyl, aralkyl, or aromatic amine.

The resulting 3-N-monosubstituted-amino-1-aryl-5-pyrazolones can be represented by the following general formula:

II.
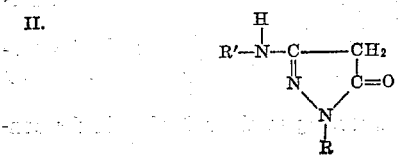

wherein R has the values given above and R′ represents an alkyl group, i.e., methyl, ethyl, propyl, butyl, amyl, hexyl, heptyl, octyl, decyl, tridecyl, octadecyl, etc.; an aralkyl group, i.e., benzyl, phenethyl, γ-propylphenyl, etc.; and an aryl group of the benzene and naphthalene series which may be substituted or not.

The aforesaid reaction may be carried out in the absence of any solvent, although certain heterocyclic bases containing a tertiary nitrogen atom such as pyridine may be advantageously employed to serve as acid-binding agents. The reaction can be carried out at room temperatures or elevated temperatures such as the boiling point of the particular solvent used.

Typical amines capable of being used in accordance with the invention are the following:

n-Butylamine
Ethylhexylamine
Ethylenediamine
Octadecylamine
Benzylamine
Aniline
o-Toluidine
p-Toluidine
m-Toluidine
Chloroanilines
Bromoanilines
α- and β-Naphthylamines
4-biphenylylamines Other amines which can be employed are highly branched tertiary alkylamines described in U.S. application Serial Number 708,374 and which are particularly useful intermediates for producing 3-N-monosubstituted-amino-1-aryl-5-pyrazolones characterized by extremely low melting points with little or no tendency towards crystallizing and by high solubility in organic solvents. Such properties are requisites when couplers are incorporated in a photographic emulsion in the form of an oily dispersion.

ω-Arylamidrazones are known compounds and their preparation from ethyl malonate monoimidester and an arylhydrazine is described in JACS 66, 1852 (1944).

As mentioned previously, the pyrazolone compounds of this invention are obtained by reacting an ω-arylamidrazone of general Formula I, or a salt thereof with an alkyl, aralkyl or aromatic primary amine in the presence or absence of solvents either at room or at elevated temperatures. Preferentially the amidrazone hydrochlorides are employed whereby hydrogen chloride formed during the reaction can either form ammonium chloride or be taken up by an excess of the primary amine used for the reaction or by using pyridine as an acid binding solvent. If the reactions are carried out at the reflux temperature of high boiling solvents such as o-dichlorobenzene, some gaseous hydrogen halide may be evolved. A particularly convenient embodiment of the present invention comprises heating the reactants together in the presence of pyridine on a steam bath for a period of about 1 hour.

Although the exact mechanism of the reaction involved herein is not fully understood, it has been established that the ω-arylamidrazones do not break down to produce 3-amino-1-aryl-5-pyrazolone under the condition of the reaction as might be predicted. Thus, a mixture of 3-amino-1-phenyl-5-pyrazolone and benzylamine were heated in the presence of pyridine on a steam bath for 1 hour after which time the 3-amino-1-phenyl-5-pyrazolone was recovered unchanged. An identical experiment was carried out in which ω-phenylamidrazone hydrochloride was substituted for the 3-amino-1-phenyl-5-pyrazolone. The product isolated, was proven to be 3-benzylamino-1-phenyl-5-pyrazolone. It is, therefore, evident that 3-amino-1-aryl-5-pyrazolone is not formed as an intermediate in the reaction of amines with ω-amidrazone hydrochloride and the above reaction is unrelated to those processes of the prior art used to produce the aforesaid pyrazolones.

It is a distinct advantage of the present invention that it is not limited to a specific set of compounds and is limited in scope only by the primary alkyl, aralkyl and aromatic amines that are available.

My invention will now be described by reference to the following specific examples, although it is to be understood that the invention is to be taken as limited only by the appended claims.

Example I 25.75 grams (0.1 mol) of ω-phenylamidrazone hydrochloride, 100 ml. of o-dichlorobenzene and 30 g. (0.1 mol) of octadecylamine were refluxed with stirring for 1 hour. On cooling, a light brown paste was formed. After addition of 500 ml. of acetonitrile, the mixture was stirred for 15 minutes with ice cooling, filtered and washed with 100 ml. of acetonitrile. 37 grams of a light brown crystalline product remained. It was boiled with 1 liter of ethyl acetate and cooled in ice. The undissolved material was removed by filtration. The filtrate was evaporated to 100 ml. On cooling in ice, a crystalline precipitate was formed. It was filtered and recrystallized from methanol. Yield 10.35 g.; M.P. 82–83° C.

*Analysis.*—Calc.: 75.83% C., 10.53% H., 9.85% N. Found: 75.73% C., 10.65% H., 10.01% N.

After analysis at M.P., the product is identical with 3-octadecylamino-1-phenyl pyrazolone described in British Patent 737,683.

Example II 2.86 grams (0.00944 mol) of ω-p-nitrophenylamidrazone hydrochloride and 2.86 g. (0.0106 mol) of actadecylamine were refluxed with 10 ml. of o-dichlorobenzene for 1 hour. A red turbid solution formed which slowly changed color to dark brown. After cooling, 40 ml. of ether were added, the reaction mixture cooled in ice and the solid filtered off and washed with 20 ml. of ether. The filter residue was recrystallized from about 100 ml. of n-propanol and gave 2.46 g. of a yellow brown product melting at 137–140° C. After recrystallization, it melted at 140–141° C.

*Analysis.*—Calc.: 68.6% C., 9.32% H., 11.85% N. Found: 68.57% C., 9.49% H., 12.05% N.

The analysis corresponds to the following formula:

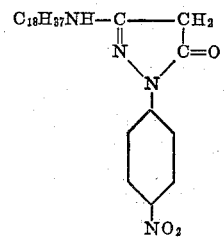

Example III 12.88 grams (0.05 mol) of ω-phenylamidrazone hydrochloride, 15 ml. of pyridine and 5.5 ml. (0.05 mol) of benzylamine were heated on a steam bath for 1 hour. The solvent was then evaporated on a steam bath at a pressure of about 3 mm. The residue was treated with 50 ml. of water and several milliliters of acetic acid, filtered and washed with 50% acetonitrile. The yield of product melting at 134–135° C. was 8.65 g., after recrystallization from 50% acetonitrile with some charcoal.

*Analysis.*—Calc.: $C_{16}H_{15}ON_3$: Calc., 72.43% C., 5.70% H., 15.84% N. Found, 72.58% C., 5.89% H., 16.06% N.

The above analysis corresponds to 3-benzylamino-1-phenyl-5-pyrazolone.

Example IV 12.88 grams (0.05 mol) of ω-phenylamidrazone hydrochloride, 10 ml. of dimethylformamide and 10.7 g. (0.1 mol) of p-toluidine were heated on a steam bath for 1 hour. The reaction product was worked up as in Example III and gave 7.7 g. of crude p-tolylamino-1-phenyl-5-pyrazolone melting at 228–229° C. after recrystallization from 70% acetic acid with some charcoal.

*Analysis.*—$C_{16}H_{15}ON_3$: Calc., 72.39% C., 5.69% H. Found, 72.30% C., 5.92% H.

The ω-arylamidrazones which were used as intermediates in the foregoing examples were prepared using the following procedure which describes the synthesis of ω-phenylamidrazone:

235 grams (1.2 mol) of diethyl monoiminomalonate hydrochloride were gradually added to 108 g. (1 mol) of phenyl hydrazine in 300 ml. of pyridine with stirring and ice cooling so that the temperature did not exceed 10° C. The stirring was continued for another hour. The ice bath was then removed and stirring discontinued. After several hours, the crude amidrazone was precipitated with 2.4 liters of ether and the mixture cooled in ice for 1 hour. The precipitate was filtered and washed with ether, treated with 150 ml. of ice water to which 2 ml. of hydrochloric acid were added, filtered again and washed with 50 ml. of ice water, followed by a wash with ether. The residue was recrystallized from n-propanol containing 1% concentrated hydrochloric acid yielding 131 g. of yellowish white large leaflets of the ω-phenylamidrazone, M.P. 200–201.5° C.

Representative hydrazines which may be used for the preparation of amidrazones are as follows:

Phenylhydrazine
4-nitrophenylhydrazine
4-bromophenylhydrazine
M-tolylhydrazine
M-trifluoromethylhydrazine
Naphthylhydrazines, etc.

I claim:

1. The method of producing a pyrazolone derivative which comprises condensing an ω-arylamidrazone hydrohalide salt with an amine selected from the class consisting of alkylamines, aralkylamines and arylamines.

2. The method of producing a 3-N-monosubstituted-amino-1-aryl-5-pyrazolone of the following general formula:

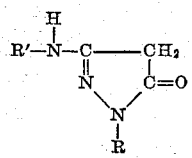

wherein R is an aryl group and R' is selected from the class consisting of alkyl, aralkyl and aryl groups which comprises condensing in a solvent an ω-arylamidrazone hydrohalide salt of the following general formula:

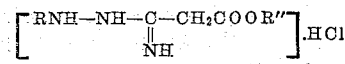

wherein R'' is a lower alkyl group and R is an aryl group with an amine selected from the class consisting of alkylamines, aralkylamines and arylamines.

3. The method according to claim 2 wherein the condensation is carried out at temperatures ranging from room temperature to 200° C.

4. The method according to claim 3 wherein the condensation is carried out in the presence of a solvent normally liquid at room temperature.

5. The method according to claim 3 wherein the condensation is carried out in the presence of a tertiary nitrogenous base.

6. The method according to claim 3 wherein the condensation is carried out in the presence of excess amine sufficient to neutralize the hydrogen halide released.

7. The method according to claim 6 wherein the condensation is carried out in refluxing o-dichlorobenzene.

8. The method according to claim 5 wherein the solvent is pyridine.

References Cited in the file of this patent
UNITED STATES PATENTS

| | | |
|---|---|---|
| 2,550,661 | Allen | May 1, 1951 |
| 2,691,659 | Graham et al. | Oct. 12, 1954 |
| 2,803,544 | Greenhalgh | Aug. 20, 1957 |

OTHER REFERENCES

Weissberger et al.: J. Am. Chem. Soc., vol. 66, pp. 1849–51 (1944).

Porter et al.: Organic Synthesis, vol. 28, pp. 87–89 (1948).

Itano: Chem. Abstracts, vol. 46, col. 4532 (1952).

Kunimine: Chem. Abstracts, vol. 47, col. 3155 (1953).

Kunimine et al.: Chem. Abstracts, vol. 49, col. 11627 (1955).

Elderfield: Heterocyclic Compounds, vol. 5, pp. 115–118 (1957).